M. C. HUTCHINSON.
ANGLE PLANING MACHINE.
APPLICATION FILED MAY 31, 1918.
1,281,965.
Patented Oct. 15, 1918.
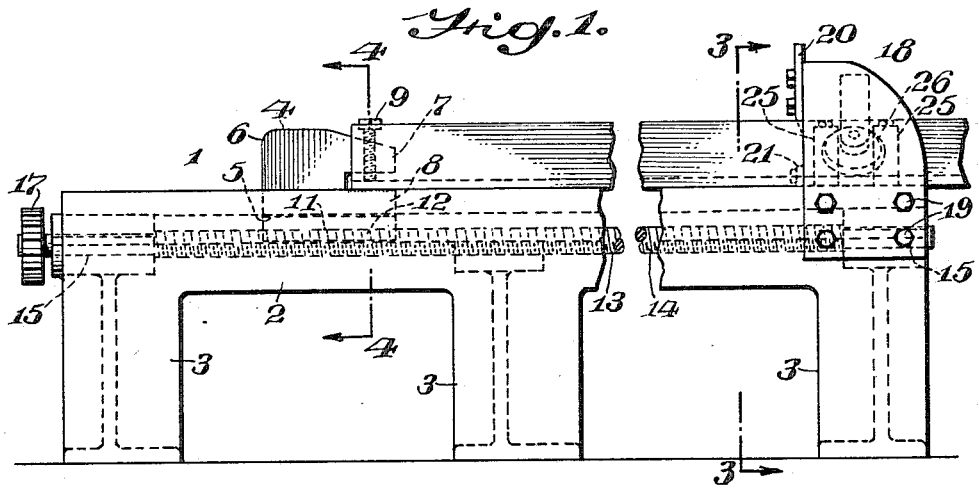
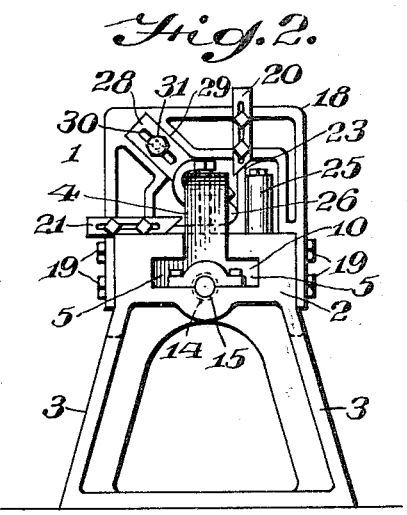
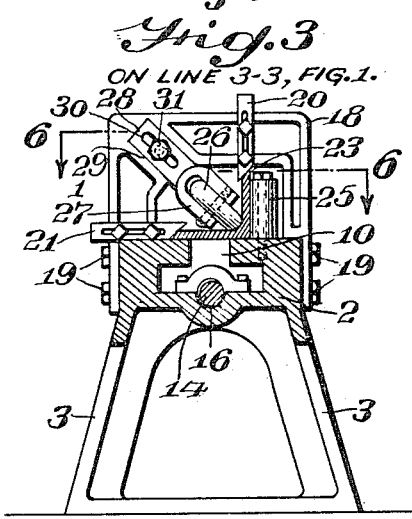
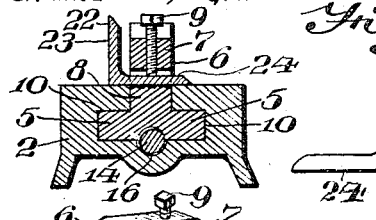
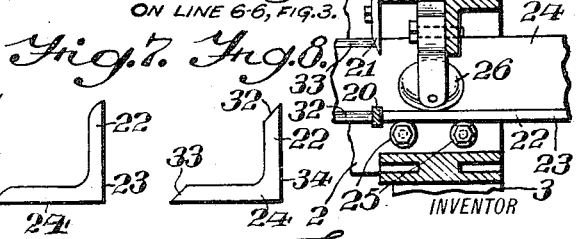
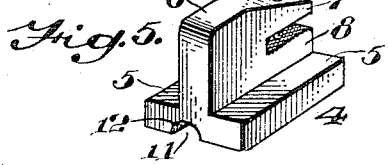
INVENTOR
Morton C. Hutchinson
BY
Wiedersheim Fairbanks
ATTORNEYS

UNITED STATES PATENT OFFICE.

MORTON C. HUTCHINSON, OF WOODBURY, NEW JERSEY, ASSIGNOR, BY DIRECT AND MESNE ASSIGNMENTS, TO SOUTHWARK FOUNDRY & MACHINE CO., OF PHILADELPHIA, PENNSYLVANIA, A CORPORATION OF PENNSYLVANIA.

ANGLE-PLANING MACHINE.

1,281,965.  Specification of Letters Patent.  Patented Oct. 15, 1918.

Application filed May 31, 1918. Serial No. 237,466.

*To all whom it may concern:*

Be it known that I, MORTON C. HUTCHINSON, a citizen of the United States, residing at Woodbury, in the county of Gloucester, State of New Jersey, have invented a new and useful Angle-Planing Machine, of which the following is a specification.

My invention consists of a novel construction of an angle planing machine, wherein provision is made for cutting or planing the rounded rolled edges of angle irons, so as to provide a preferably beveled or other machined or finished edge suitable for calking, it being essential to provide means not only for retaining the angle iron in proper position with respect to the stationary cutting or planing implements during the planing operation, but, in addition, to provide means for feeding or propelling the angle iron with respect to said cutting and planing devices, whereby I provide the angle iron with a beveled or calking edge which is straight and parallel to the corner edge of the angle.

In carrying out my invention, I provide novel means for drawing or pulling the angle iron past two stationary cutting tools, one for each edge of the angle, by means of a steady, uniform and positive screw pull, which pulls the angle past the cutters or planing implements, whereby both edges of the angle are cut or planed simultaneously, said cutting tools being clamped rigidly to a fixed head, said angle iron during the planing operation being propelled by means of a sliding head provided with suitable serrated jaws between which an end of the angle is secured, said head being actuated by a long screw which simultaneously pulls the sliding head and the angle iron along a long table, said stationary cutting tools being so correlated with respect to their stationary supporting head and the angle iron, as to cut or plane the edges thereof to the desired angle or contour as it is drawn along, the angle being retained in proper relation to the cutting or planing tools by one angular and two or more vertical rollers.

To the above ends my invention consists of a novel construction of angle planing machine, which can be cheaply manufactured, is durable, effective and not liable to get out of order, and which enables the planing or beveling of the edges of angles of
varying dimensions to be simultaneously and expeditiously effected.

It further consists of a novel construction of a sliding screw-propelled head having jaws into which an end of the angle iron to be planed is adapted to be inserted and secured, and novel means for effecting the simultaneous propulsion of said sliding head and angle iron.

It further consists of a novel construction of a stationary head, carrying vertical and horizontal cutting tools or planing implements.

It further consists of a novel collocation of inclined and vertical rolls for retaining in position an angle iron with respect to the cutting tools during the planing operation.

It further consists of other novel features of construction, all as will be hereinafter fully set forth.

For the purpose of illustrating my invention, I have shown in the accompanying drawings, certain forms thereof which are at present preferred by me, since the same will give in practice satisfactory and reliable results. It is to be understood, however, that the various instrumentalities of which my invention consists can be variously arranged and organized and that my invention is not limited to the precise arrangement and organization of these instrumentalities as shown and described herein except as defined in the appended claims.

Figure 1 represents a side elevation of an angle planing machine embodying my invention.

Fig. 2 represents an end view of Fig. 1.

Fig. 3 represents a section on line 3—3 Fig. 1.

Fig. 4 represents a section on line 4—4 Fig. 1.

Fig. 5 represents in detached position a perspective view of the sliding head in which an end of the angle is secured.

Fig. 6 represents a section on line 6—6 Fig. 3.

Fig. 7 represents an end view of an angle iron before being planed.

Fig. 8 represents an angle iron after being planed in my novel machine.

Similar numerals of reference indicate corresponding parts.

Referring to the drawings:—

1 designates my novel construction of angle planing machine, the same comprising a bed or table 2, which is preferably a long cast iron sectional structure, provided at intervals with legs 3 which may be shaped somewhat like the letter A, as will be understood from Figs. 2 and 3.

4 designates a sliding head, whose construction will be best understood from the perspective view in Fig. 5, said head being shaped somewhat like an inverted letter T, and provided with the bottom flanges 5 and the vertical member 6, the forward end of which latter is provided with the jaws 7 and 8, one or both of which may be serrated, while through the upper jaw 7 passes a bolt 9, for securing an end of an angle in position.

As will be understood from Figs. 4 and 5, the lower portion or bottom flanges 5 of the sliding head 4 travel in similarly T-shaped guides or ways 10 in the table 2, as will be understood from Figs. 2 and 3, whereby the head 4 is caused to have a steady motion during its longitudinal travel in said ways. The bottom of the head 4 has a semi-circular groove 11 cut in it along its longitudinal axis, as will be understood from Fig. 5, said groove being provided with screw threads 12 of suitable design, which thus form what may be termed a "half nut," in which threads 13 of the same dimension as said threads 12 engage, said threads 13 being cut upon the long screw or threaded rod 14 (as will be understood from Fig. 1), which is located in the central longitudinal axis of the table 2.

The end bearings 15 are provided to carry the screw 14, and in addition to these bearings 15, I provide a long semi-circular trough 16, which is cast into the top of the table 2 for the purpose of supporting said screw between said bearings 15, in order to prevent said screw 14 from sagging as the sliding head 4 passes over it. The screw 14 may be actuated or rotated from any suitable source of power, as will be evident to those skilled in the art, which should be so applied as to simultaneously rotate the screw and propel the sliding head at the proper or desirable cutting speed in one direction, while said head may be returned at a higher rate of speed to receive another angle.

At the left-hand of Fig. 1, I have shown a pinion 17 to which power may be applied by suitable gearing (not shown), actuated by an electric or other motor (not shown), it being seen, as will be evident to those skilled in the art, that any suitable power creating device may be employed together with any suitable automatic or reversing mechanism, whereby the rotation of the screw 14 and the simultaneous propulsion of the head 4 may be effected to the desired extent, after which the direction of rotation of the pinion 17 and the screw 14 can be reversed by any suitable or automatic mechanism so as to propel the head 4 in the opposite direction.

18 designates a fixed head which may be bolted or otherwise secured to the table 2, as indicated at 19, said head 18 serving as a support for the vertical and horizontal cutting tools or planing implements 20 and 21, said vertical tool 20 cutting or planing the edge of the vertical member 22 of the angle iron 23, while the horizontal cutting tool 21 planes the edge of the horizontal member 24 of said angle iron, as will be understood from Figs. 2 and 3, said vertical member 22 of said angle iron being retained in proper position by the vertical rollers 25, which prevent the angle iron from moving horizontally, while the angular or inclined roller 26 which is journaled in the arms 27 of the holder 28 press the angle iron against the table and against said vertical rollers during the planing operation, as will be understood from Figs. 3 and 6.

The angular or inclined roller 26 is preferably inclined at an angle of about 45 degrees and the upper portion of the roller holder 28 is guided in the inclined ways 29, so that the desired adjustment of the frame 28 can be readily effected through the medium of the slot 30 and the bolt 31, as will be evident to those skilled in the art, the adjustability of said angular roller 26 being desirable in order to provide for the planing of various sized angles or angles of varying cross-sectional area.

Both the angular or inclined roller 26 and the vertical rollers 25 are preferably arranged so as to bear on the angle a little ahead of the cutting tools or on that part of the angle which is just approaching the cutting edges of said tools 20 and 21, but it will be apparent that the relative position of said rollers and tools may be varied, if desired.

The operation is as follows:—

An angle iron as it comes from the rolling mill generally appears substantially as indicated in Fig. 7, the edges of the vertical and horizontal members thereof being somewhat rounded by the rolling operation. An angel iron in this condition is bolted or otherwise secured between the jaws 7 and 8 of the head 4, as will be understood from Figs. 1, 4 and 5, the sliding head 4, however, being farther to the right or closer to the stationary head 18 than shown in Fig. 1, when the planing operation commences. The pinion 17 and the threaded screw 14 having been caused to rotate by any suitable mechanism, the sliding head 4 will be propelled or drawn to the left by a positive screw pull, and the cutting tools 20 and 21 having been properly adjusted with respect to the angle by means of the bolts and the slots seen therein, it will be apparent that both edges of the limbs or members of the angle iron will be simultaneously cut or planed at one operation and in the finished angle iron a beveled or chamfered calking edge will be produced, as seen at 32 and 33 in Fig. 8, the finished or planed angle iron 34 seen in said figure being then provided with edges suitable for calking, said calking edges 32 and 33 being straight and parallel to the corner edge of the angle, as is evident.

When the head 4 has reached substantially its extreme left-hand position, it will be understood that the planing operation has been completed and the angle iron can then be removed. The direction of rotation of the screw 14 is then reversed and the sliding head 4 caused to move to the right toward the stationary head 18, at preferably a higher speed, said sliding head when in its extreme right-hand position being ready to receive another angle for planing.

By the provision of the inverted T-shaped sliding head 4 and the provision of the flanges, 5, it will be seen that a steady longitudinal motion can be imparted to said head 4 and the angle iron during its longitudinal travel, particularly to the left, when it is performing its function of drawing or pulling the angle iron past the two cutting tools 20 and 21, and by the provision of the angular or inclined roller 26 and the vertical rollers 25, any improper movement of the angle iron is prevented under all conditions, the angular roller 26 pressing the angle 23 against the two vertical rollers, as will be understood from Fig. 3.

It will be understood by those skilled in the art, that angle irons which are used in ship construction and in other locations, are frequently of varying lengths, and for purposes of economic construction, I preferably design the table 2 in sections, which can be bolted together to form a rigid structure of any desired length, and it will be further apparent to those skilled in the art, that the screw 14 may be provided with suitable thrust bearings at the end at which power is applied, which same I deem it unnecessary to describe, as their manner of operation and construction will be apparent to those skilled in the art.

It will be apparent from the foregoing that by my novel invention, by reason of the adjustability of the cutting tools 20 and 21, and by reason of the provision for adjusting the angular or inclined roller 26, that angle irons of different lengths and different dimensions in cross-section can be effectively planed in my novel machine.

While the cutting tools 20 and 21 are shown as beveling the edges of the angle irons at a certain angle desirable for certain classes of shipyard work, it will be evident that the position and contour of these cutting tools may be slightly varied, and that said cutting tools may be differently mounted without departing from the spirit of my invention, and that any desired bevel may be given to the edges of the angle, as desired.

It will further be apparent to those skilled in the art, that my novel machine provides a positive screw pull, which is uniform and steady under all conditions, and which pulls the angles at a steady and uniform rate of speed past the cutters 20 and 21, so that the disadvantages arising from the old type of angle planing machines are obviated, since in certain of these old machines with which I am familiar, slipping of the angle occurs and marring of the surfaces of the angle during the planing operation, said old machines of the prior art with which I am familiar operating somewhat after the manner of a clothes wringer, whereas in my novel machine the rollers employed merely act as guides to keep the angles in proper position relative to the cutting tools 20 and 21.

It will further be understood by those skilled in the art that, if desired, an automatic cut-off switch or mechanism (not shown), may be employed, which will prevent the screw 14 from propelling or drawing the sliding head 4 past a predetermined point in either direction, but I have deemed it unnecessary to describe this construction in detail, as the general construction and operation of the same will be familiar to those skilled in the art.

Having thus described my invention, what I claim as new and desire to secure by Letters Patent, is:—

1. In an angle planing machine, a table, a stationary head having vertical and horizontal cutting tools adjustably mounted thereon, guiding devices for the material to be planed, a sliding head mounted on said table, and a positive screw pull mechanism for said sliding head.

2. In an angle planing machine, a table, a stationary head having vertical and horizontal cutting tools adjustably mounted thereon, an angular roller and a plurality of vertical rollers for guiding the material to be planed, a sliding head adapted to receive an end of the angle to be planed, and a screw feed mechanism for actuating said sliding head.

3. In an angle planing machine, a table a feed screw, a sliding head actuated by said feed screw and adapted to receive the end of the angle to be planed, a stationary head, and vertical and horizontal cutting tools carried by said latter head.

4. In an angle planing machine, a feed screw extending longitudinally thereof, a sliding head mounted in ways on said table and actuated by said feed screw, jaws in said head adapted to receive an end of the angle to be planed, a stationary head, vertical and horizontal cutting tools carried by said stationary head, a pair of vertical guide rollers for guiding the angle to be planed, and an adjustable inclined roller located intermediate of said vertical rollers.

5. In an angle planing machine, a table, a feed screw extending longitudinally thereof, a sliding head of inverted T-shape, said head being adapted to receive an end of the angle to be planed, a stationary head, vertical and horizontal cutting tools carried by said latter head, a pair of vertical guiding rollers, and an inclined roller for guiding said angle iron.

6. In an angle planing machine, a table, a feed screw extending longitudinally thereof, a sliding head actuated by said feed screw, end and intermediate bearings for said feed screw to prevent the latter from sagging, jaws on said sliding head, a clamping bolt passing through one of said jaws, a stationary head, vertically and horizontally adjustable cutting tools carried by said stationary head, an inclined roller adjustably mounted on said stationary head, and vertical rollers located on either side of said inclined roller.

7. In an angle planing machine, a table, a stationary head mounted thereon, an adjustable inclined roller carried thereby, vertical guide rollers located out of alinement with said inclined roller, cutting tools mounted on said stationary head, a sliding head, and means for imparting a positive screw pull to said sliding head.

8. In an angle planing machine, a feed screw, a sliding head actuated by said feed screw and adapted to receive an end of the angle to be planed, a stationary head, cutting tools carried by said stationary head for imparting the desired bevel to the angle to be planed, and guiding devices for guiding the angle to be planed, said guiding devices being located in proximity to said cutting tools.

9. In an angle planing machine, a feed screw, a sliding head actuated by said feed screw and adapted to receive an end of the article to be planed, a stationary head, and cutting tools carried by said stationary head for imparting the desired bevel to the edges of the article to be planed.

MORTON C. HUTCHINSON.

Witnesses:
R. H. MOYER,
LEON L. BUCHANAN.

Copies of this patent may be obtained for five cents each, by addressing the "Commissioner of Patents, Washington, D. C."